United States Patent
Matsudaira et al.

[11] Patent Number: 6,096,431
[45] Date of Patent: *Aug. 1, 2000

[54] BIODEGRADABLE CARDS

[75] Inventors: Nagahisa Matsudaira; Toshibumi Imai; Li Han Sen, all of Saitama; Masayuki Taniguchi, Tokyo, all of Japan

[73] Assignee: Toppan Printing Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/503,831

[22] Filed: Jul. 18, 1995

[30] Foreign Application Priority Data

| Jul. 25, 1994 | [JP] | Japan | 6-172516 |
| Dec. 26, 1994 | [JP] | Japan | 6-322335 |
| Dec. 27, 1994 | [JP] | Japan | 6-325790 |

[51] Int. Cl.⁷ ............ B42B 15/10; B32B 21/36
[52] U.S. Cl. ............ 428/423.7; 283/82; 283/107; 360/2; 428/195; 428/480; 428/694; 428/910
[58] Field of Search ............ 283/107, 901, 283/903, 904, 82; 428/480, 423.7, 910, 483, 694 SL, 195; 360/2

[56] References Cited

U.S. PATENT DOCUMENTS

| 4,973,515 | 11/1990 | Ontanari et al. | 428/315.5 |
| 5,391,423 | 2/1995 | Wnuk et al. | 428/217 |
| 5,403,897 | 4/1995 | Ebato et al. | 525/444 |
| 5,444,113 | 8/1995 | Sinclair et al. | 524/306 |
| 5,766,748 | 6/1998 | Ikado et al. | 428/220 |

FOREIGN PATENT DOCUMENTS

| 0 510 998 A2 | 10/1992 | European Pat. Off. |
| 0 697 427 A2 | 2/1996 | European Pat. Off. |
| 6115242 | 4/1992 | Japan |
| WO 84/00302 | 2/1984 | WIPO |
| WO 92/04412 | 3/1992 | WIPO |
| WO 94/07941 | 4/1994 | WIPO |

OTHER PUBLICATIONS

Derwent Publication Ltd., JP 06 115 242 A, Apr. 26, 1994.

*Primary Examiner*—Paul Thibodeau
*Assistant Examiner*—D. Lawrence Tarazano
*Attorney, Agent, or Firm*—Burns, Doane, Swecker & Mathis, LLP

[57] ABSTRACT

A biaxially oriented sheet of a biodegradable thermoplastic resin composition containing a lactic acid polymer is used as a structural materials for a supporting substrate of a biodegradable card. The lactic acid polymer has a number average molecular weight of from 10,000 to 1,000,000. The thermoplastic resin composition may preferably be mixed with a modifying biodegradable resin. In another embodiment, the biaxially oriented sheet of the biodegradable thermoplastic resin composition may preferably be covered with the modifying biodegradable resin. The biodegradable lactic acid polymer or the modifying biodegradable resin is also used as a polymeric binder of an information recording layer provided on the surface of the supporting substrate.

13 Claims, 2 Drawing Sheets

BIODEGRADABLE CARDS

BACKGROUND OF THE INVENTION

1. Field of the Invention

This invention relates to a card such as a prepaid card. More particularly, it relates to a card having superior gate-access properties with respect to a read-write head and also being biodegradable.

2. Description of the Related Art

In recent years, identification (ID) cards or membership cards which identify yourselves and cash cards, credit cards, prepaid cards, commutation ticket cards, coupon ticket cards or the like which have cash values are being used in many fields.

Among these, the prepaid cards are comprised of a card in which some information of value corresponding to an amount of money prepaid in a certain unit is recorded. In such prepaid cards, a print layer formed of characters or letters, patterns or designs, bar codes or the like or a magnetic recodeing layer or optical recording layer is provided on a substrate, and the value information or distinguishing information for the prepaid cards is read from or written in that layer through a read-write head. Accordingly, the prepaid cards are required to satisfy gate-access properties (mechanical properties required when the card is applied to the gate of a read-write head, as exemplified by durability, folding endurance and rigidity) good enough for the cards to be applicable to such a read-write head and yet required to be manufactured with ease. Hence, as a supporting substrate serving as a structural material of the prepaid cards, polyethylene terephthalate (PET) resin is mainly used.

In the case of ID cards, membership cards, cash cards, credit cards and so forth, polyvinyl chloride (PVC) resin is also commonly used as the supporting substrate.

Now, these cards are put away when used up, and most of them are buried and given away in soil in waste disposal grounds. Since, however, the PET and PVC constituting the supporting substrates of these cards are not biodegradable, they are not degraded and turn into semi-permanent refuse with their shapes remaining as they are. Thus, there is an anxiety about bad influence on natural environment.

Hence, as supporting substrates for such cards, it has been attempted to use paper substrates made of paper, which is a biodegradable natural material. It has been also proposed to use biodegradable resin substrates (Japanese Patent Applications Laid-open No. 5-42786 and No. 5-85088) comprised of photodegradable or biodegradable synthetic resins (Japanese Patent Applications Laid-open No. 57-150393, No. 59-220192, No. 51-93991, No. 63-260912 and No. 57-150393). It is still also proposed to use a biodegradable resin coated paper substrate formed by lamination of a thin film of a biodegradable resin of the same kind as the above (Japanese Patent Application Laid-open No. 7-9788).

In the case of the paper substrates, however, there has been the problem that card properties such as durability, folding endurance, water resistance, chemical resistance, surface smoothness, glossiness and workability required for cards can not be well satisfied. Hence, the cards making use of paper as supporting substrates are used in cards of disposable types such as pass tickets, admission tickets and railroad tickets, which are thrown away after used once, but it has been difficult for such cards to be used in prepaid cards or the like which are repeatedly used reasonably many times for a certain period of time. In this case, for the purpose of improving the mechanical properties of the paper substrate, one may contemplate to laminate synthetic resin such as polyethylene, polypropylene, polyvinyl chloride or polyethylene terephthalate or a metal foil such as aluminum foil to its surface as a protective layer. Since, however, these materials for such a protective layer exhibit no sufficient biodegradability, the protective layer itself turns into semi-permanent refuse and also the paper substrate remaining on the inner side of the protective layer becomes biodegradable with difficulty. There has been such a problem.

In the case of the biodegradable resin substrates, there have been the problems that they are available in a high cost and also they are unsatisfactory in mechanical properties such as folding endurance and rigidity.

In the case of the biodegradable resin coated paper substrates, water may soak into cards from their edges when the cards are immersed in water, e.g., when the cards are washed by oversight, to cause the cards to curl or elongate or cause their edges to turn up, leaving a problem on its water resistance. Hence, the applicability of such cards to read-write heads may become very low.

SUMMARY OF THE INVENTION

An object of the present invention is to provide a card that has gate-access properties good enough to be applicable to a read-write head, has good water resistance, can endure its use repeated many times, and also employs a biodegradable supporting substrate.

The present invention provides a biodegradable card having a supporting substrate comprising a biaxially oriented sheet of a biodegradable thermoplastic resin composition containing a lactic acid polymer.

DETAILED DESCRIPTION OF THE INVENTION

The card of the present invention employs, as its supporting substrate which is a structural material, a biaxially oriented sheet, not a mere sheet, of a thermoplastic resin composition mainly composed of a lactic acid polymer. Thus, the supporting substrate of the card is biodegradable, and can have mechanical properties comparable to those of conventional polyester substrates and polyvinyl chloride resin substrates, e.g., can have good durability, rigidity, moldability, mechanical strength, hardness, impact strength, dimensional stability and folding endurance. Hence, the card of the present invention, having such a supporting substrate, can exhibit good gate-access properties with respect to read-write heads and also is biodegradable.

The biodegradable card of the present invention will be described below in detail with reference to the accompanying drawings.

Figure 1:
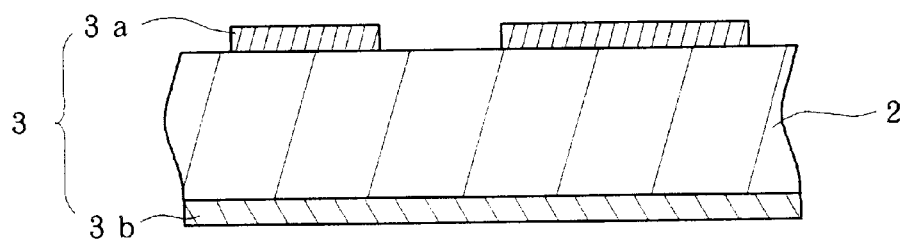
FIGS. 1 to 3 are each a cross-sectional illustration of the biodegradable card of the present invention.

In FIG. 1, a card 1 has a structure wherein an information recording layer 3 is formed on a supporting substrate 2. As examples of the information recording layer 3 formed on the supporting substrate 2 of the biodegradable card of the present invention, it can be exemplified by a visible-information design layer 3a formed of, e.g., letters, patterns or bar codes and a magnetic recording layer or thermal recording layer 3b.

In the present invention, the supporting substrate 2 is formed of, as described above, a biaxially oriented sheet of a thermoplastic resin composition mainly composed of a lactic acid polymer, capable of exhibiting a biodegradability. Herein, the lactic acid polymer refers to a homopolymer of lactic acid (i.e., polylactic acid) or a copolymer of lactic acid with a hydroxycarboxylic acid. In this instance, as the lactic acid serving as a polymerization unit that constitutes the lactic acid polymer, a D-form, an L-form or a mixture thereof may be used.

In the present invention, it is preferable to use a lactic acid polymer having a number average molecular weight of from 10,000 to 1,000,000. This is because, if its number average molecular weight is too small, the gate-access properties may lower and if it is too large, the rate of biodegradation may decrease.

As methods for producing the polylactic acid from lactic acid, usual dehydration condensation can only give an oligomer with a low degree of polymerization, having a molecular weight of less than 4,000. Hence a method (an indirect method) in which an oligomer of lactic acid is once produced and the resulting oligomer is subjected to ring-opening polymerization, a method in which lactic acid is polymerized in the presence of a catalyst (Japanese Patent Applications Laid-open No. 59-96123 and No. 62-289020), and a method (a direct method) in which it is polymerized in an environment of inert gas under heat and pressure without use of a catalyst (U.S. Pat. No. 199,597, U.S. Pat. No. 2,362,511 and U.S. Pat. No. 2,683,136) may be used. As for the copolymer of lactic acid with a hydroxycarboxylic acid, e.g., glycolic acid, 6-hydroxycaproic acid, tartaric acid or malic acid, it can be produced by subjecting such monomers to copolymerization according to a known process (U.S. Pat. No. 3,636,956 and U.S. Pat. No. 3,797,449), which can achieve a higher degree of polymerization than the homopolymers of lactic acid. In this copolymerization, from the viewpoint of solubility in solvents, the lactic acid and the hydroxycarboxylic acid may preferably be used in a monomer ratio of from 1:4 to 1:1, and more preferably from 2:3 to 2:5.

Figure 2:
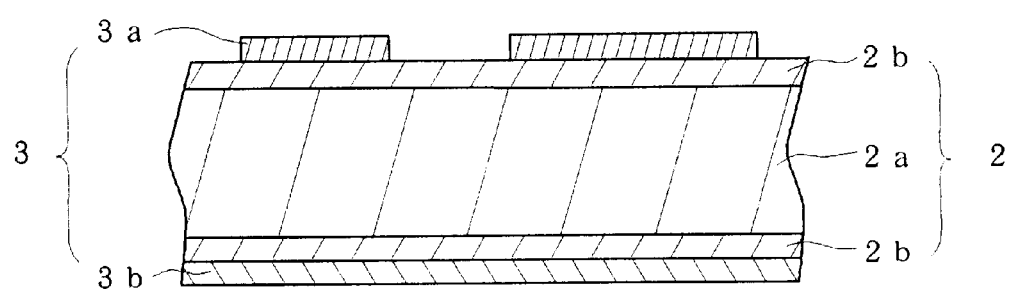
Figure 3:
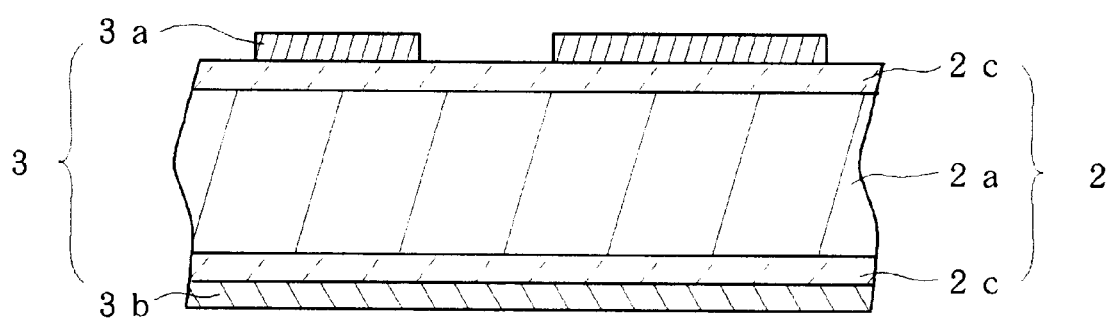

In FIG. 1, the supporting substrate 2 is constituted of a single layer. It may be constituted of multiple layers (2a, 2b) as shown in FIG. 2, formed by laminating biodegradable thermoplastic resin compositions separately prepared from two kinds of lactic acid polymers different each other. In this instance, the layers are not necessarily limited to two kinds of layers, and may be made more than that.

The sheet of the thermoplastic resin composition containing the lactic acid polymer as a main component may be biaxially oriented, sequentially or simultaneously, under conditions of a draw ratio of from 2×2 to 6×6, and preferably from 3×3 to 5×5, and a drawing temperature not lower than a glass transition point and not higher than a melting point, in view of the improvement in mechanical strength.

Incidentally, the lactic acid polymer has the properties that it undergoes hydrolysis during storage if the polymerization catalyst or unreacted monomers has or have remained in it. Hence, the polymerization catalyst and unreacted monomers should be well removed therefrom. Since, however, the biodegradation of the lactic acid polymer begins to take place after it has been first hydrolyzed and has come to have a low molecular weight, the rate of biodegradation is also consequently greatly held down if the polymer becomes biodegradable with difficulty.

Thus, in order to improve its biodegradability without causing any lowering of the gate-access properties of the supporting substrate 2 comprised of the thermoplastic resin composition containing the lactic acid polymer, it is preferable to add to the thermoplastic resin composition a resin having a biodegradability superior to the lactic acid polymer (hereinafter called "modifying biodegradable resin") and to form the supporting substrate 2 from the resulting mixture. In this instance, the gate-access properties of the biodegradable card may lower if the modifying biodegradable resin is added in a too large quantity, and its addition can not be effective if it is added in a too small quantity. Hence, the lactic acid polymer and the modifying biodegradable resin should preferably be used in a mixing ratio (weight ratio) of from 97:3 to 80:20, and more preferably from 95:5 to 90:10.

As another means for improving the biodegradability without causing a lowering of the gate-access properties of the supporting substrate 2 comprised of the thermoplastic resin composition containing the lactic acid polymer, biodegradable coat layers 2c formed of the modifying biodegradable resin may be laminated, as shown in FIG. 2, to the surfaces of a biaxially oriented sheet 2a comprised of the thermoplastic resin composition containing the lactic acid polymer, by any known method, e.g., by dry lamination, wet lamination or hot-melt coating. In this instance, the layer thickness of the biaxially oriented sheet 2 comprised of the thermoplastic resin composition can be made smaller within such a range that the gate-access properties are not adversely affected, and hence the biodegradability of the supporting substrate 2 as a whole can be improved.

When biaxially oriented ones are used as the biodegradable coat layers 2c, the gate-access properties of the supporting substrate 2 can be more improved.

The modifying biodegradable resin used in the present invention may preferably include known resins shown below as resins (A) to (D). The following modifying biodegradable resins have no sufficient mechanical properties and can form the supporting substrate 2 with difficulty when used alone. They, however, can be effectively used in cards when used in combination with the lactic acid polymer having superior mechanical properties and gate-access properties.

(A) Aliphatic Polyester Resin Having a Hydroxyalkanoate Unit:

The hydroxyalkanoate unit refers to a unit originating from a hydroxycarboxylic acid (e.g., 3-hydroxylactic acid) other than lactic acid. The aliphatic polyester resin having such a hydroxyalkanoate unit may include poly(3-hydroxylactic acid), poly(3-hydroxyvaleric acid), 3-hydroxycapric acid, 3-hydroxyheptanoic acid, and a 3-hydroxybutyric acid/3-hydroxyvaleric acid copolymer. This 3-hydroxybutyric acid/3-hydroxyvaleric acid copolymer can be biosynthesized by allowing hydrogen bacteria to act on propionic acid and glucose (P. A. Homes, Phys. Technol., 16, 32 (1985), and is commercially available from Zeneca Co., Great Britain (trade name: BIOPOL).

(B) Polyester Polyurethane Resin Represented by Formula (1):

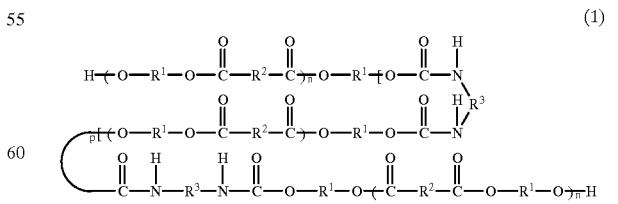

In Formula (1), n represents a degree of polymerization; p represents a number of 0 or 1 or more, and preferably from 500 to 1,000; $R^1$ and $R^2$ each independently represent a divalent hydrocarbon group having 2 to 10, and preferably 2 to 4, carbon atoms as exemplified by a straight-chain or branched alkylene group (e.g., an ethylene group or a butylene group), a heterocyclic group (e.g. a γ-butyrolactone residual group, a β-propiolactone residual group, a β-butyrolactone residual group or a pivalolactone residual group), or a cycloalkylene group (e.g., a cycldhexylene group); and $R^3$ represents a di- or poly-isocyanate residual group (e.g., a tolylenediisocyanate residual group, a diphenylmethanediisocyanate residual group or a xylylenediisocyanate residual group. If the resin of Formula (1) has a too small number average molecular weight, the resin has a low melting point to become brittle. If it has a too large number average molecular weight, the resin has a high melt viscosity to become moldable with difficulty. Hence, those preferably having a number average molecular weight of from 10,000 to 100,000, and more preferably from 30,000 to 40,000, may be used.

The resin of Formula (1) can be produced according to the process disclosed in Japanese Patent Application Laid-open No. 4-189822, i.e., by allowing a polyester obtained by polycondensation of a cyclic or non-cyclic aliphatic glycol with a cyclic or non-cyclic aliphatic dicarboxylic acid or an anhydride thereof to react with a diisocyanate or polyisocyanate.

(C) Polyester Resin Represented by Formula (2):

In Formula (2), q represents a degree of polymerization; and $R^{11}$ and $R^{12}$ each represent a divalent hydrocarbon group having 2 to 10, and preferably 2 to 4, carbon atoms as exemplified by a straight-chain or branched alkylene group (e.g., an ethylene group or a butylene group), a heterocyclic group (e.g. a γ-butyrolactone residual group, a β-propiolactone residual group, a β-butyrolactone residual group or a pivalolactone residual group), or a cycloalkylene group (e.g., a cyclohexylene group). If the resin of Formula (2) has a too small number average molecular weight, the resin has a low melting point to become brittle. If it has a too large number average molecular weight, the resin has a high melt viscosity to become moldable with difficulty. Hence, those preferably having a number average molecular weight of from 25,000 to 70,000, and more preferably from 30,000 to 40,000, may be used.

The resin of Formula (2) can be produced according to the process disclosed in Japanese Patent Application Laid-open No. 4-122205, i.e., by polycondensation of a cyclic or non-cyclic aliphatic glycol with a cyclic or non-cyclic aliphatic dicarboxylic acid or an anhydride thereof.

(D) Polycaprolactone Resin, a Homopolymer or Copolymer Having a Polymer Unit Represented by Formula (3):

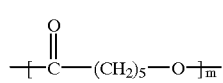

(3)

In Formula (3), m represents a number to show the degree of polymerization. If the polycaprolactone resin has a too small molecular weight, its film forming properties may lower, and if it has a too large molecular weight, its solubility in solvents may decrease. Hence, those preferably having a molecular weight of from 10,000 to 100,000, and more preferably from 70,000 to 90,000, may be used. Materials with which the caprolactone is copolymerized may include polyesters such as polylactide and polyethylene isophthalate, polyglycolides, and polyamides.

The polycaprolactone resin is readily soluble or readily dispersible in general-purpose non-halogen organic solvents including ketones such as methyl ethyl ketone, acetone and isobutyl ketone, and aromatic hydrocarbons such as toluene and xylene. Hence, when the biodegradable coat layer 32b is formed, it can be formed into film without use of halogen type solvents.

In the present invention, the thermoplastic resin composition containing the lactic acid polymer may be further optionally incorporated with various additives and polymers usually used in card substrates. In this instance, such additives and polymers may be non-biodegradable materials. However, excessive addition of non-biodegradable materials to the supporting substrate 2 makes the biodegradability of the supporting substrate 2 very low or may cause a problem on workability, and hence such materials may preferably be added in an amount less than 50% by weight.

As examples of such additives, they may include various additives used as occasion calls, as exemplified by a coloring preventive agent, which may be added in an amount of from 0.05 to 3 parts by weight, an antioxidant, which may be added in an amount of from 0.05 to 3 parts by weight, a lubricant, which may be added in an amount of from 0.05 to 5 parts by weight, an organic pigment, and an inorganic pigment. In particular, in order to improve the gate-access properties of the supporting substrate 2, it is preferable to add as a filler an inorganic filler such as calcium carbonate, mica, calcium silicate, white carbon, asbestos, china clay (fired) or glass fiber.

The information recording layer 3 formed on the supporting substrate of the biodegradable card of the present invention may include, as previously described, the visible-information design layer 3a and the magnetic recording layer or the thermal recording layer 3b (FIG. 1). Almost all of these layers are formed by coating on the supporting substrate 2 an information recording layer forming coating composition prepared by dissolving or dispersing a polymeric binder and additives such as a pigment and a magnetic powder in a solvent, followed by drying. In such an instance, it is preferable to use a biodegradable resin as the polymeric binder of the information recording layer forming coating composition so that not only the supporting substrate 2 but also the whole card may become biodegradable.

As the biodegradable resin, it is possible to use the lactic acid polymer or modifying biodegradable resins (A) to (D) described above, or polyglycolic acid. In particular, from the viewpoint of gate-access properties, it is preferable to use the lactic acid polymer. From the viewpoint of the advantages that the resin well dissolves in volatile non-halogen type general-purpose solvents and hence a coating composition with a high stability can be obtained, and also soft film properties can be achieved, it is preferable to use the polycaprolactone resin. These biodegradable resins may also be appropriately mixed with each other and used as a mixed polymeric binder. In such an instance, the polycaprolactone resin may preferably be incorporated in an amount not less than 20% by weight so that the information recording layer 3 can be prevented from curling when it is formed.

In the information recording layer forming coating composition, a binder resin conventionally used in printing inks may be used in combination, in addition to the biodegradable polymeric binder. For example, it is possible to use nitrocellulose, a vinyl chloride/vinyl acetate copolymer, polyester resin or the like. This enables control of coating properties of the coating composition and mechanical properties of the information recording layer 3 in accordance with the purposes for which the card is used. In this instance, the biodegradation takes place at the biodegradable binder resin portion in the information recording layer 3, so that the layer can not retain its original form as a whole to break down into fine pieces. Hence, in this instance also, the information recording layer 3 is biodegradable. The information recording layer 3 may be further optionally mixed with a colorant, a magnetic powder, a dispersant and so forth which are known in the art. As preferred examples of the dispersant, it may include alkylallyl sulfonates, dinaphthalenesulfonate methane, dialkyl succinates, allylnaphthalene sulfonates, and polyoxyethylene alkyl-alkylallyl ethers.

To achieve an improvement of physical and chemical properties of the information recording layer 3, the layer may be three-dimensionally cross-linked with a cross-linking agent, preferably an isocyanate type cross-linking agent, in accordance with the content of hydroxyl groups (OH) and carboxyl groups (COOH) of the biodegradable polymeric binder, so long as the biodegradability is not adversely affected by it. The thickness of the information recording layer may appropriately determined in accordance with use purposes.

In the foregoing, a layer containing the polymeric binder is described as the information recording layer 3. An information recording layer not containing a biodegradable polymeric binder may also be applied in the present invention. For example, a dye thin film formed by coating an alcohol solution of a heat-sensitive leuco dye or heat-sensitive diazo dye, followed by drying, or a thin film formed of a low-melting metal such as aluminum or tin may also be used as a heat-sensitive recording layer.

The biodegradable card of the present invention can be produced by conventional methods. For example, it can be produced by extruding the lactic acid polymer and optionally the modifying biodegradable resin and additives into a sheet by melt extrusion, biaxially orienting the resulting sheet to form the supporting substrate, and coating on its surface the information recording layer forming coating composition containing the biodegradable polymeric binder by a known process such as offset printing, screen printing or gravure printing, followed by drying to form the information recorded layer.

EXAMPLES

The biodegradable card of the present invention will be described below in greater detail by giving Examples. In the following Examples, the read-write head used is a read-write head of an automatic ticket inspector manufactured by Omron Tateishi Electronics Co.

Example 1

First, 60% by weight of a copolymer of L-lactic acid with 6-hydroxycaproic acid in a monomer ratio of 3:2 and with a number average molecular weight of 150,000, 35% by weight of mica (HAR160, available from Shiraishi Kogyo Kaisha, Ltd.) and 5% by weight of titanium oxide were kneaded by means of a vented extruder. Thereafter, the kneaded product obtained was extruded in a prescribed thickness by means of a T-die melt extruder at a working temperature of 200° C., followed by biaxial orientation (under conditions of a rate of 100 mm/second, a temperature of 90° C. and a draw ratio of 3×3) and then calendering to obtain a 188 μm thick card substrate with an improved surface smoothness.

This card substrate showed a flexural modulus of 40,000 kgf/cm$^2$, and had properties close to those of polyethylene terephthalate (PET) resin sheets.

Next, on this card substrate, a magnetic coating material having the composition as shown in Table 1 was coated by knife coating to form a black magnetic recording layer of about 10 μm thick, which was then subjected to magnetic-field orientation in a horizontal magnetic field of about 3,000 gauss, followed by drying for 3 minutes with 100° C. hot air.

TABLE 1

Magnetic Coating Material

| Component | Amount (parts by weight) |
|---|---|
| Magnetic powder (1,750 Oe; barium ferrite) | 100 |
| Vinyl chloride/vinyl acetate copolymer (trade name: VAGT: available from Union Carbide Corp.) | 20 |
| Polyurethane resin (trade name: NIPPORAN 2304; Nippon Polyurethane Industry Co., Ltd.) | 30 |
| Hexamethylene diisocyanate (trade name: COLONATE; Nippon Polyurethane Industry Co., Ltd.) | 2 |
| Carbon black (#300; available from Mitsubishi Chemical Industries, Ltd.) | 5 |
| Dispersant (trade name: GARFAC RE-610; available from Toho Chemical Industry Co., Ltd.9 | 3 |
| Diluting solvent (toluene/MEK/MIBK) | 100 |

The card substrate thus obtained was worked in a card size of 57.5 mm wide and 85.0 mm long to produce a card like the one shown in FIG. 1.

The card thus obtained was passed through the gate of a read-write head for cards at a speed of 2 m/second. As a result, there was nothing wrong. This card was immersed in water for 30 seconds and, after the water was wiped off, similarly again passed through the gate, where there was nothing wrong. Here, the card had a rigidity (JIS P8125) of 30 gf/cm at its short side, and no change was seen before and after it was immersed in water. Then, this card was buried in the soil of a field to observe the state of degradation. As a result, upon elapse of 6 months, the card was in such a state that it retained no original shape but leaving the magnetic recording layer.

Mechanical strength of the card of Example 1 was also compared with cards produced using other card substrates to obtain the results as shown in Table 2.

In the following, Example 2 is an example of a card obtained in the same manner as in Example 1 except for using no filler. Comparative Example 1 is an example of a card obtained in the same manner as in Example 1 except that the lactic acid polymer was replaced with a 3-hydroxybutylate/3-hydroxyvalerate (5%) copolymer. Comparative Example 2 is an example of a card obtained in the same manner as in Comparative Example 1 except for changing the content of the 3-hydroxyvalerate copolymer to 12%. The substrates of Comparative Examples 3 and 4 are paper substrates, of which the substrate of Comparative Example 4 is a paper substrate that had been immersed in water.

TABLE 2

Comparison of Mechanical Strength
[Rigidity (gf/cm) of card at short side]

| Example | | Comparative Example | | | |
|---|---|---|---|---|---|
| 1 | 2* | 1** | 2** | 3*** | 4**** |
| 30 | 24 | 18 | 15 | 21 | 4 |

\* resin alone
\*\* biodegradable resin
\*\*\* paper substrate
\*\*\*\* water-immersed As shown in the above, the cards of Examples 1 and 2 had a mechanical strength superior to the cards of Comparative Examples. In particular, the card of Example 1, mixed with a filler, showed a remarkable improvement in mechanical strength.

Example 3

First, 60% by weight of poly(L-lactic acid) with a number average molecular weight of 1,000,000, 35% by weight of mica (HAR160, available from Shiraishi Kogyo Co., Ltd.) and 5% by weight of titanium oxide were kneaded by means of a vented extruder. Thereafter, the kneaded product obtained was extruded in a prescribed thickness by means of a T-die melt extruder at a working temperature of 200° C., followed by biaxial orientation (under conditions of a rate of 80 mm/second, a temperature of 95° C. and a draw ratio of 2×2) and then calendering to obtain a 560 thick, first biaxially oriented sheet (a core sheet) with an improved surface smoothness.

Next, 60% by weight of a copolymer of L-lactic acid with 6-hydroxycaproic acid in a monomer ratio of 3:2 and with a number average molecular weight of 150,000 was kneaded by means of a vented extruder. Thereafter, the kneaded product obtained was extruded in a prescribed thickness by means of a T-die melt extruder at a working temperature of 200° C., followed by biaxial orientation (under conditions of a rate of 200 mm/second, a temperature of 95° C. and a draw ratio of 5×5) and then calendering to obtain a 100 $\mu$m thick, second biaxially oriented sheet (a cover sheet) with an improved surface smoothness.

Subsequently, the cover sheet was laminated to both sides of the core sheet obtained, and a magnetic recording layer was formed in the same manner as in Example 1 to produce a card like the one shown in FIG. 2. This card showed a tensile strength of 4.9 kg/mm$^2$, a softening temperature of 100° C., which was higher than that of vinyl chloride resin cards. The card was also immersed in 120° C. liquid paraffin for 5 minutes, but caused no separation of the lamination of sheets, showing properties substantially the same as, or better than, those of vinyl chloride resin cards as a whole.

Then, this card was buried in the soil of a field to observe the state of degradation. As a result, upon elapse of 6 months, the card was in such a state that it retained no original shape but leaving the magnetic recording layer.

As described above, the cards of Examples 1 to 3 make use of the supporting substrate comprising the biaxially oriented sheet of a thermoplastic resin composition containing the lactic acid polymer as a main component. Hence, they are excellent in mechanical properties such as rigidity, moldability, mechanical strength, hardness, impact strength, dimensional stability and folding endurance, have gate-access properties good enough to be applicable to read-write heads, and also are biodegradable by microorganisms or the like even when left in the natural world, so that it is possible to decrease the influence on environment by their disposal.

Moreover, since they have excellent mechanical properties, the thickness of the biodegradable thermoplastic resin composition sheet, i.e., the quantity of the resin used can be decreased to enable reduction of production cost, and also since they have substantially the same strength and durability as the case when conventional plastics are used, they can be well durable even when used in existing disposable cards.

The biodegradable thermoplastic resin compositions used in the cards of Examples 1 to 3 may have physical properties and workability inferior to those of conventional plastics in some respect, but their physical properties and workability can be improved when additives and non-degradable plastics are mixed in such an amount that their biodegradability does not lower.

Example 4

First, 55% by weight of a copolymer of L-lactic acid with 6-hydroxycaproic acid in a monomer ratio of 3:2 and with a number average molecular weight of 80,000, 5% by weight of an aliphatic polyester polyurethane resin represented by Formula (1) (trade name: BIONOLLE; available from Showa Highpolymer Co., Ltd.) with a number average molecular weight of 50,000, 35% by weight of mica (HAR160, available from Shiraishi Kogyo Co., Ltd.) as an additive and 5% by weight of titanium oxide (dried at 200° C. for 24 hours) were kneaded by means of a vented extruder. Thereafter, the kneaded product obtained was extruded in a prescribed thickness by means of a T-die melt extruder at a working temperature of 200° C., followed by biaxial orientation (under conditions of a rate of 100 mm/second, a temperature of 90° C. and a draw ratio of 3×3) and then calendering to obtain a 188 $\mu$m thick card substrate with an improved surface smoothness.

This card substrate showed a flexural modulus of 43,000 kgf/cm$^2$, and had properties close to those of polyethylene terephthalate (PET) resin sheets.

This card substrate was left to stand in an environment of 40° C./90% RH for 48 hours, but caused neither change in folding endurance nor offensive smell.

Next, on this card substrate, the same magnetic coating material as used in Example 1 was coated by knife coating to form a black magnetic recording layer of about 10 $\mu$m thick, which was then subjected to magnetic-field orientation in a horizontal magnetic field of about 3,000 gauss, followed by drying for 3 minutes with 100° C. hot air.

Then, the card substrate was worked in a card size of 57.5 mm wide and 85.0 mm long to produce a card.

The card thus obtained was passed through the gate of a read-write head for cards about 500 times at a speed of 2 m/second. As a result, there was nothing wrong on the card, e.g., the card was not caught. Next, this card was immersed in water for 30 seconds and, after the water was wiped off, similarly again passed through the gate, where there was nothing wrong on the card, e.g., the card was not caught. Here, the card had a rigidity (JIS P8125) of 30 gf/cm at its short side, and no change was seen before and after it was immersed in water. Then, this card was buried in the soil of a field to observe the state of degradation. As a result, upon elapse of 10 months, the card had been degraded into such a state that it retained no original shape but leaving the magnetic recording layer.

The card of the present Example 4 was also left in activated sludge to observe its changes with time. As a result, upon elapse of 6 months, a decrease in weight and a lowering of mechanical strength were seen. For comparison, a card of Example 5 was produced in the same manner as in Example 4 except for using no resin of Formula (1), and similarly left in activated sludge. As a result, upon elapse of 6 months, a decrease in weight and a lowering of mechanical strength were seen but in lower degrees than those in Example 4. As is seen from this result, the addition of the resin of Formula (1) contributed the improvement in biodegradability.

Example 6

First, 55% by weight of a copolymer of L-lactic acid with 6-hydroxycaproic acid in a monomer ratio of 3:2 and with a number average molecular weight of 150,000, 5% by weight of an aliphatic polyester resin represented by Formula (2) (trade name: BIONOLLE; available from Showa Highpolymer Co., Ltd.) with a number average molecular weight of 10,000, 35% by weight of mica (HAR160, available from Shiraishi Kogyo Co., Ltd.) as an additive and 5% by weight of titanium oxide were kneaded by means of a vented extruder. Thereafter, the kneaded product obtained was extruded in a prescribed thickness by means of a T-die melt extruder at a working temperature of 200° C., followed by biaxial orientation (under conditions of a rate of 150 mm/second, a temperature of 95° C. and a draw ratio of 4×4) and then calendering to obtain a 188 μm thick card substrate with an improved surface smoothness.

This card substrate showed a flexural modulus of 41,000 kgf/cm², and had properties close to those of polyethylene terephthalate (PET) resin sheets.

This card substrate was left to stand in an environment of 40° C./90% RH for 48 hours, but caused neither change in folding endurance nor offensive smell.

On this card substrate, the same magnetic coating material as used in Example 1 was coated by knife coating to form a black magnetic recording layer of about 10 μm thick, which was then subjected to magnetic-field orientation in a horizontal magnetic field of about 3,000 gauss, followed by drying for 3 minutes with 100° C. hot air.

This card substrate was worked in a card size of 57.5 mm wide and 85.0 mm long to produce a card.

The card thus obtained was passed through the gate of a read-write head for cards about 500 times at a speed of 2 m/second. As a result, there was nothing wrong on the card, e.g., the card was not caught. Next, this card was immersed in water for 30 seconds and, after the water was wiped off, similarly again passed through the gate, where there was nothing wrong on the card, e.g., the card was not caught. Here, the card had a rigidity (JIS P8125) of 30 gf/cm at its short side, and no change was seen before and after it was immersed in water. Then, this card was buried in the soil of a field to observe the state of degradation. As a result, upon elapse of 10 months, the card had been degraded into such a state that it retained no original shape but leaving the magnetic recording layer.

The card of the present Example 6 was left in activated sludge to observe its changes with time. As a result, upon elapse of 6 months, a decrease in weight and a lowering of mechanical strength were seen.

Example 7

First, 55% by weight of a copolymer of L-lactic acid with 6-hydroxycaproic acid in a monomer ratio of 3:2 and with a number average molecular weight of 150,000, 5% by weight of a copolymer comprised of units of 3-hydroxyvalerate and 3-hydroxybutyrate (trade name: BIOPOL; available from Zeneca Co., Great Britain; containing 12% of hydroxyvalerate) as a modifying biodegradable resin, 35% by weight of mica (HAR160, available from Shiraishi Kogyo Co., Ltd.) as an additive and 5% by weight of titanium oxide were kneaded by means of a vented extruder. Thereafter, the kneaded product obtained was extruded in a prescribed thickness by means of a T-die melt extruder at a working temperature of 200° C., followed by biaxial orientation (under conditions of a rate of 100 mm/second, a temperature of 90° C. and a draw ratio of 3×3) and then calendering to obtain a 188 μm thick card substrate with an improved surface smoothness.

This card substrate showed a flexural modulus of 39,000 kgf/cm², and had properties close to those of polyethylene terephthalate (PET) resin sheets.

This card substrate was left to stand in an environment of 40° C./90% RH for 48 hours, but caused neither change in folding endurance nor offensive smell.

On this card substrate, the same magnetic coating material as used in Example 1 was coated by knife coating to form a black magnetic recording layer of about 10 μm thick, which was then subjected to magnetic-field orientation in a horizontal magnetic field of about 3,000 gauss, followed by drying for 3 minutes with 100° C. hot air.

This card substrate was worked in a card size of 57.5 mm wide and 85.0 mm long to produce a card.

The card thus obtained was passed through the gate of a read-write head for cards about 500 times at a speed of 2 m/second. As a result, there was nothing wrong on the card, e.g., the card was not caught. Next, this card was immersed in water for 30 seconds and, after the water was wiped off, similarly again passed through the gate, where there was nothing wrong on the card, e.g., the card was not caught. Here, the card had a rigidity (JIS P8125) of 30 gf/cm at its short side, and no change was seen before and after it was immersed in water. Then, this card was buried in the soil of a field to observe the state of degradation. As a result, upon elapse of 8 months, the card had been degraded into such a state that it retained no original shape but leaving the magnetic recording layer.

The card of the present Example 7 was left in activated sludge to observe its changes with time. As a result, upon elapse of 6 months, a decrease in weight and a lowering of mechanical strength were seen.

All the cards of Examples 4 to 7 were also caused no changes in mechanical properties such as folding endurance after they were left in a room (room temperature) and 10 months lapsed.

As described above, according to the cards of Examples 4 to 7, the supporting substrate is formed of the thermoplastic resin composition comprised of the lactic acid polymer and the modifying biodegradable resin. Hence, they cause no material deterioration during storage, showing a storage stability, they are surely biodegradable after their disposal, and also they are excellent in mechanical properties such as rigidity, moldability, mechanical strength, hardness, impact strength, dimensional stability and folding endurance. Especially in the case of commutation ticket cards or the like, they have gate-access properties good enough to be repeatedly applicable to read-write heads. Namely, they are biodegradable cards that can satisfy all the conditions of mechanical properties required for cards, storage stability and biodegradability, and can well substitute cards making use of conventional plastics.

The biodegradable thermoplastic resin compositions used in the cards of Examples 4 to 7 may have physical properties and workability inferior to those of conventional plastics in some respect, but their physical properties and workability can be improved when additives are used or the sheets formed are biaxially oriented in such an amount or extent that their biodegradability does not lower.

The biodegradable thermoplastic resin compositions used in Examples 4 to 7 can also be used in packaging materials or molding materials for packaging containers, trays, storage containers and so forth, may undergo no biodegradation in environments usually used, as in rooms, and can well substitute plastic materials presently used. Also, the products made of such compositions can be surely degraded in a short period of time in their disposal other than burning, and hence it is possible to decrease the influence on environment by their disposal.

Example 8

First, 60% by weight of a copolymer of L-lactic acid with 6-hydroxycaproic acid in a monomer ratio of 3:2 and with a number average molecular weight of 150,000, 35% by weight of mica (HAR160, available from Shiraishi Kogyo Co., Ltd.) as an additive and 5% by weight of titanium oxide (dried at 200° C. for 24 hours) were kneaded by means of a vented extruder. Thereafter, the kneaded product obtained was extruded in a prescribed thickness by means of a T-die melt extruder at a working temperature of 200° C., followed by biaxial orientation (under conditions of a rate of 100 mm/second, a temperature of 90° C. and a draw ratio of 3×3) and then calendering to obtain a 158 μm thick, biaxially oriented sheet (a core sheet) with an improved surface smoothness.

Then, 80% by weight of an aliphatic polyester polyurethane resin represented by Formula (1) (trade name: BIONOLLE; available from Showa Highpolymer Co., Ltd.) with a number average molecular weight of 10,000, 35% by weight of mica (HAR160, available from Shiraishi Kogyo Co., Ltd.) as an additive and 5% by weight of titanium oxide (dried at 200° C. for 24 hours) were kneaded by means of a vented extruder. Thereafter, the kneaded product obtained was extruded in a prescribed thickness by means of a T-die melt extruder at a working temperature of 200° C., followed by biaxial orientation (under conditions of a rate of 200 mm/second, a temperature of 85° C. and a draw ratio of 6×6) and then calendering to obtain a 15 μm thick, biodegradable cover sheet (an oversheet) with an improved surface smoothness. This oversheet was laminated to both sides of the core sheet previously obtained, to produce a 188 μm thick card substrate.

This card substrate showed a flexural modulus of 45,000 kgf/cm$^2$, and had properties close to those of polyethylene terephthalate (PET) resin sheets.

This card substrate was left to stand in an environment of 40° C./90% RH for 48 hours, but caused neither change in folding endurance nor offensive smell. In other words, the lamination of such an oversheet made it possible to maintain the mechanical strength without causing hydrolysis in the core sheet formed of the lactic acid polymer.

On this card substrate, the same magnetic coating material as used in Example 1 was coated by knife coating to form a black magnetic recording layer of about 10 μm thick, which was then subjected to magnetic-field orientation in a horizontal magnetic field of about 3,000 gauss, followed by drying for 3 minutes with 100° C. hot air.

The resulting card substrate was worked in a card size of 57.5 mm wide and 85.0 mm long to produce a card.

The card thus obtained was passed through the gate of a read-write head for cards at a speed of 2 m/second with repetition of about 500 times. As a result, there was nothing wrong on the card, e.g., the card was not caught. Next, this card was immersed in water for 30 seconds and, after the water was wiped off, similarly again passed through the gate, where there was nothing wrong on the card, e.g., the card was not caught. Here, the card had a rigidity (JIS P8125) of 26 gf/cm at its short side, and no change was seen before and after it was immersed in water. Then, this card was buried in the soil of a field to observe the state of degradation. As a result, upon elapse of 6 months, the card had been degraded into such a state that it retained no original shape but leaving the magnetic recording layer.

Example 9

First, 55% by weight of a copolymer of L-lactic acid with 6-hydroxycaproic acid in a monomer ratio of 3:2 and with a number average molecular weight of 150,000, 35% by weight of mica (HAR160, available from Shiraishi Kogyo Co., Ltd.) as an additive and 5% by weight of titanium oxide (dried at 200° C. for 24 hours) were kneaded by means of a vented extruder. Thereafter, the kneaded product obtained was extruded in a prescribed thickness by means of a T-die melt extruder at a working temperature of 200° C., followed by biaxial orientation (under conditions of a rate of 100 mm/second, a temperature of 90° C. and a draw ratio of 3×3) and then calendering to obtain a 158 μm thick, biaxially oriented sheet (a core sheet) with an improved surface smoothness.

Then, 5% by weight of an aliphatic polyester resin represented by Formula (2) (trade name: BIONOLLE; available from Showa Highpolymer Co., Ltd.) with a number average molecular weight of 10,000, 35% by weight of mica (HAR160, available from Shiraishi Kogyo Co., Ltd.) as an additive and 5% by weight of titanium oxide (dried at 200° C. for 24 hours) were kneaded by means of a vented extruder. Thereafter, the kneaded product obtained was extruded in a prescribed thickness by means of a T-die melt extruder at a working temperature of 200° C., followed by biaxial orientation (under conditions of a rate of 200 mm/second, a temperature of 85° C. and a draw ratio of 6×6) and then calendering to obtain a 15 μm thick, biodegradable coat sheet (an oversheet) with an improved surface smoothness. This oversheet was laminated to both sides of the core sheet previously obtained, to produce a 188 μm thick card substrate.

This card substrate showed a flexural modulus of 25,000 kgf/cm$^2$, and had properties close to those of polyethylene terephthalate (PET) resin sheets.

Like Example 8, this card substrate was left to stand in an environment of 40° C./90% RH for 48 hours, but caused neither change in folding endurance nor offensive smell. In other words, the lamination of such an oversheet made it possible to maintain the mechanical strength without causing hydrolysis in the core sheet formed of the lactic acid polymer.

The resulting card substrate was worked in a card size of 57.5 mm wide and 85.0 mm long to produce a card.

The card thus obtained was passed through the gate of a read-write head for cards at a speed of 2 m/second with repetition of about 500 times. As a result, there was nothing wrong on the card, e.g., the card was not caught. Next, this card was immersed in water for 30 seconds and, after the water was wiped off, similarly again passed through the gate, where there was nothing wrong on the card, e.g., the card was not caught, and no change was seen before and after it was immersed in water. Then, this card was buried in the soil of a field to observe the state of degradation. As a result, upon elapse of about a year, the card had been degraded into such a state that it retained no original shape.

Example 10

First, 60% by weight of poly(L-lactic acid) with a number average molecular weight of 1,000,000, 35% by weight of mica (HAR160, available from Shiraishi Kogyo Co., Ltd.) as an additive and 5% by weight of titanium oxide were kneaded by means of a vented extruder. Thereafter, the kneaded product obtained was extruded in a prescribed thickness by means of a T-die melt extruder at a working temperature of 200° C., followed by biaxial orientation (under conditions of a rate of 50 mm/second, a temperature of 95° C. and a draw ratio of 2×2) and then calendering to obtain a 718 μm thick, biaxially oriented sheet (a core sheet) with an improved surface smoothness.

Then, 60% by weight of an aliphatic polyester resin represented by Formula (2) (trade name: BIONOLLE; available from Showa Highpolymer Co., Ltd.) with a number average molecular weight of 10,000, 35% by weight of mica (HAR160, available from Shiraishi Kogyo Co., Ltd.) as an additive and 5% by weight of titanium oxide (dried at 200° C. for 24 hours) were kneaded by means of a vented extruder. Thereafter, the kneaded product obtained was extruded in a prescribed thickness by means of a T-die melt extruder at a working temperature of 200° C., followed by biaxial orientation (under conditions of a rate of 200 mm/second, a temperature of 85° C. and a draw ratio of 5×5) and then calendering to obtain a 25 µm thick, biodegradable coat sheet (an oversheet) with an improved surface smoothness. This oversheet was laminated to both sides of the core sheet previously obtained, to produce a 760 µm thick laminated card substrate.

This card showed a tensile strength of 5.1 kg/mm², a softening temperature of 120° C., which was higher than that of vinyl chloride resin cards. The card was also immersed in 150° C. liquid paraffin for 5 minutes, but caused no separation of the lamination of sheets, showing lamination properties such as heat-resistant adhesion substantially the same as, or better than, those of vinyl chloride resin cards.

This card substrate was left to stand in an environment of 40° C./90% RH for 48 hours, but caused neither change in folding endurance nor offensive smell.

The resulting card substrate was worked in a card size of 57.5 mm wide and 85.0 mm long to produce a card.

Then, this card was buried in the soil of a field to observe the state of degradation. As a result, upon elapse of 6 months, the card had been degraded into such a state that it retained no original shape.

As described above, according to the cards of Examples 8 to 10, the sheet formed of the thermoplastic resin composition comprised of the modifying biodegradable resin is laminated to the surfaces of the biaxially oriented sheet formed of the lactic acid polymer. Hence, they cause no material deterioration (in particular, hydrolysis) during storage, showing a storage stability, they are surely biodegradable after their disposal in soil, compost treating tanks or the like, also they are excellent in mechanical properties such as rigidity, moldability, mechanical strength, hardness, impact strength, dimensional stability and folding endurance, and they have gate-access properties good enough to be applicable to read-write heads. Namely, they are biodegradable cards that can satisfy all the conditions of mechanical properties required for cards, storage stability and biodegradability, and can well substitute cards making use of conventional plastics.

The biodegradable thermoplastic resin compositions used in the cards of Examples 8 to 10 may have physical properties and workability inferior to those of conventional plastics in some respect, but their physical properties and workability can be improved when additives are used or the sheets formed are biaxially oriented in such an amount or extent that their biodegradability does not lower.

Example 11

Poly(lactic acid) (trade name: LACTY; available from Shimadzu Seisakusho Corporation) was formed into a sheet in a thickness of about 200 µm by melt extrusion to prepare a biodegradable card supporting substrate.

Next, a mixture of components shown in Table 3 (coating composition 1) was put into a hermetically closed container, and then mixed and dispersed for two hours together with glass beads by means of a paint shaker. In the ink thus formed, 2 parts by weight of a polyisocyanate hardening agent (trade name: COLONATE EH; available from Nippon Polyurethane Industry Co., Ltd.) was added and mixed to obtain a printing ink.

The printing ink thus obtained was applied to the substrate in a pattern by gravure coating, followed by drying in a 80° C. oven for 1 minute, and the resulting printed substrate was punched in a given size to produce a biodegradable card.

TABLE 3

Coating Composition 1 (Indigo Coating Material)

| Component | Amount (parts by weight) |
|---|---|
| Pigment (copper phthalocyanine blue) | 10 |
| Extender pigment (calcium carbonate) | 8 |
| Poly-ε-caprolactone (trade name: TONE 767; available from Union Carbide Corp.) | 20 |
| Surface active agent (trade name: DEMOL-N; available from Kao Corporation) | 0.5 |
| Methyl ethyl ketone/toluene: 1/1 | 61.5 |

Example 12

P[3HB-3HV] (3-hydroxybutyrate/3-hydroxyvalerate copolymer; trade name: BIOPOL D600; available from Zeneca Co.) was formed into a sheet in a thickness of about 200 µm by melt pressing to prepare a biodegradable card supporting substrate.

Next, of the components shown in Table 4 (coating composition 2), resin (a) and resin (b) were dissolved together with the surface active agent and the solvent by means of a homomixer, and thereafter the carbon black was mixed. The resulting mixture was mixed and pulverized by sand milling so as to be in an average particle diameter of 1.5 µm, and 3.5 parts by weight of a polyisocyanate hardening agent (trade name: COLONATE EH; available from Nippon Polyurethane Industry Co., Ltd.) was further added and mixed to obtain a printing ink.

Using the printing ink thus obtained, a pattern of bar codes was printed on the substrate by reverse-roll coating, followed by drying in a 80° C. oven for 1 minute, and the resulting printed substrate was punched in a given size to produce a biodegradable card.

TABLE 4

Coating Composition 1 (Black Coating Material)

| Component | Amount (parts by weight) |
|---|---|
| Pigment (carbon black) | 10 |
| Resin (a): Poly-ε-caprolactone (trade name: PLACCEL; available from Daicel Chemical Industries, Ltd.) | 12 |
| Resin (b): Vinyl chloride/vinyl acetate copolymer (trade name: S-LEC; available from Sekisui Chemical Co., Ltd.) | 15 |
| Surface active agent (trade name: DEMOL-N; available from Kao Corporation) | 0.3 |
| Methyl ethyl ketone/THF: 2/1 | 62.7 |

Example 13

Poly(lactic acid) (trade name: LACTY; available from Shimadzu Seisakusho Corporation) and an aliphatic polyester (trade name: BIONOLLE; available from Showa Highpolymer Co., Ltd.) were melt-blended by means of a twin-screw extruder to pelletize, and the pellets obtained were formed into a sheet in a thickness of about 200 μm by melt extrusion to prepare a biodegradable card supporting substrate.

Next, using a printing ink composed as shown in Table 5 (coating composition 3), fine halftone dots were printed on the substrate to produce a biodegradable portrait card.

TABLE 5

Coating Composition 3

| Component | Amount (parts by weight) |
|---|---|
| - Yellow Color Coating Material - | |
| Pigment (Disazo Yellow AAA) | 20 |
| Extender pigment (alumina white) | 10 |
| Poly(lactic acid) (trade name: LACTY; available from Shimadzu Seisakusho Corporation) | 20 |
| Surface active agent (trade name: DEMOL-N; available from Kao Corporation) | 0.2 |
| Acetonitrile | 49.8 |
| - Magenta Color Coating Material - | |
| Pigment (Lake Red C) | 10 |
| Extender pigment (alumina white) | 8 |
| Poly(lactic acid) (trade name: LACTY; available from Shimadzu Seisakusho Corporation) | 15 |
| Surface active agent (trade name: DEMOL-N; available from Kao Corporation) | 0.5 |
| Acetonitrile | 66.5 |
| - Cyan Color Coating Material - | |
| Pigment (Phthalocyanine Blue) | 15 |
| Extender pigment (alumina white) | 8 |
| Poly(lactic acid) (trade name: LACTY; available from Shimadzu Seisakusho Corporation) | 20 |
| Surface active agent (trade name: DEMOL-N; available from Kao Corporation) | 0.5 |
| Acetonitrile | 66.5 |

Example 14

Poly(lactic acid) (trade name: LACTY; available from Shimadzu Seisakusho Corporation) and an aliphatic polyester (trade name: BIONOLLE; available from Showa Highpolymer Co., Ltd.) were melt-blended by means of a twin-screw extruder to pelletize, and the pellets obtained were melt-laminated to both sides of a paper substrate (thickness: 150 μm) in a thickness of about 200 μm each by melt extrusion to prepare a biodegradable card supporting substrate.

Next, using the same printing ink as used in Example 13 (coating composition 3), fine halftone dots were printed on the substrate to produce a biodegradable portrait card.

Comparative Example 5

A comparative card was produced in the same manner as in Example 11 except that the biodegradable resin poly-ε-caprolactone was replaced with 90 parts by weight of a general-purpose polyurethane resin (trade name: NIPPORAN 3113; available from Nippon Polyurethane Industry Co., Ltd.; solid content: 20%).

Comparative Example 6

A comparative card was produced in the same manner as in Example 12 except that the biodegradable substrate was replaced with a PET sheet (trade name: LUMIROR #188; available from Toray Industries Co., Ltd.).

Comparative Example 7

A comparative card was produced in the same manner as in Example 14 except that the melt-laminated layer formed of the blend polymer of poly(lactic acid) and an aliphatic polyester was replaced with a PE sheet, which was laminated to the paper substrate.

Evaluation

The biodegradability of the cards produced in Examples 11 to 14 and Comparative Example 5 to 7 each was evaluated by a burying test in soil. More specifically, the magnetic recording sheets were buried in the soil of a field in autumn and the state of their degradation was periodically observed. As is seen from the result of observation shown below, the cards of Examples 11 to 14 showed good biodegradability, but the cards of Comparative Examples 5 to 7 remained as they were, at least in part, without undergoing biodegradation, leaving a problem on biodegradability.

Results of observation in burying tests in soil

Card of Example 11

Two months after buried, the substrate retained its original shape, but the print layer (the information recording layer) had been degraded discontinuously and did not retain its original shape. Further, upon elapse of 8 months, the substrate also had been degraded and did not retain its original shape.

Cards of Examples 12 and 13

Two months after buried, the substrates retained their original shapes, but the print layers had been degraded discontinuously and did not retain their original shapes. Further, upon elapse of 5 months, the substrates also had been degraded and did not retain their original shapes.

Card of Example 14

Two months after buried, the layers laminated to the substrate surfaces retained their original shapes, but the print layer and the paper substrate portion of the substrate had been degraded discontinuously and did not retain their original shapes. Further, upon elapse of 5 months, the layers laminated also did not retain their original shapes.

Card of Comparative Example 5

Two months after buried, both the substrate and the print layer remained in their original shapes. Further, upon elapse of 8 months, the substrate had been degraded and did not retain their original shapes, but the print layer remained as it was in the previous state and it was as much as some mold was seen to have slightly propagated itself on the surface of the print layer.

Card of Comparative Example 6

Two months after buried, the print layer had been degraded discontinuously and did not retain its original shape, but the substrate remained in its original shape. Further, even upon elapse of 8 months, the substrate had not been degraded, and retained its original shape, where it was as much as some mold was seen to have slightly propagated itself on its surfaces.

Card of Comparative Example 17

Two months after buried, the print layer and the paper substrate portion of the substrate had been degraded discontinuously and did not retain their original shapes, but the layers (polyethylene) laminated to the substrate surfaces retained their original shapes. Further, even upon elapse of 8 months, the layers laminated had not been degraded, and retained its original shape, where it was as much as some mold was seen to have slightly propagated itself on its surfaces.

As described above, in the biodegradable cards of Examples 11 to 14, the whole card, including the print layer, was biodegraded when put away in the soil.

What is claimed is:

1. A biodegradable card, comprising a supporting substrate and laminated on at least one side thereof a biodegradable resin layer, said supporting substrate comprises a biaxially oriented sheet which is made of a biodegradable thermoplastic resin composition containing a lactic acid polymer; said biodegradable card possesses sufficient durability, folding endurance and rigidity to be useful in providing gate-access through the gate of a read-write head, and said biodegradable resin layer contains an aliphatic polyester resin having a hydroxyalkanoate unit.

2. The biodegradable card of claim 1, wherein said lactic acid polymer has a number average molecular weight of from 10,000 to 1,000,000.

3. The biodegradable card of claim 1, further comprising an information recording layer formed on the supporting substrate or the biodegradable resin layer which contains a biodegradable polymer.

4. A biodegradable card, comprising a supporting substrate and laminated on at least one side thereof a biodegradable resin layer, said supporting substrate comprises a biaxially oriented sheet which is made of a biodegradable thermoplastic resin composition containing a lactic acid polymer; said biodegradable card possesses sufficient durability, folding endurance and rigidity to be useful in providing gate-access through the gate of a read-write head, and said biodegradable resin layer contains at least one resin selected from the group consisting of (A) a polyester polyurethane resin with a number average molecular weight of from 10,000 to 100,000, represented by Formula (1):

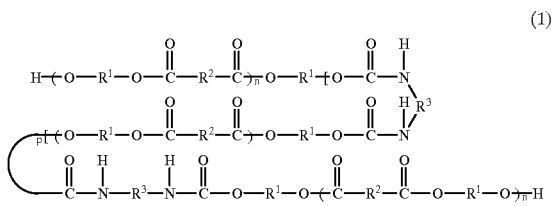

wherein n represents a degree of polymerization; p represents a number of 0 or 1 or more; $R^1$ and $R^2$ each independently represent a divalent hydrocarbon group having 2 to 10 carbon atoms; and $R^3$ represents a di- or poly-isocyanate residual group;

(B) a polyester resin with a number average molecular weight of from 25,000 to 70,000, represented by Formula (2):

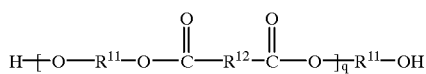

wherein q represents a degree of polymerization, and $R^{11}$ and $R^{12}$ each represent a divalent hydrocarbon group having 2 to 10 carbon atoms;

(C) a polycaprolactone resin with a number average molecular weight of from 10,000 to 100,000, having a polymer unit represented by Formula (3):

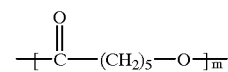

wherein m represents a degree of polymerization.

5. The biodegradable card of claim 4, wherein said lactic acid polymer has a number average molecular weight of from 10,000 to 1,000,000.

6. The biodegradable card of claim 4, wherein said biodegradable resin layer contains a polyester polyurethane resin with a number average molecular weight of from 10,000 to 100,000, represented by Formula (1):

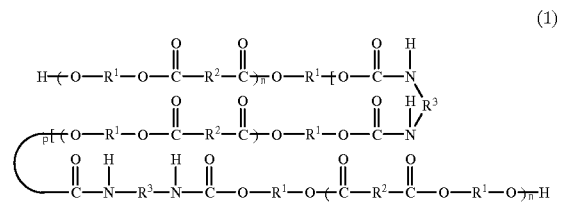

wherein n represents a degree of polymerization; p represents a number of 0 or 1 or more; $R^1$ and $R^2$ each independently represent a divalent hydrocarbon group having 2 to 10 carbon atoms; and $R^3$ represents a di- or poly-isocyanate residual group.

7. A biodegradable card of claim 4, wherein said biodegradable resin layer contains a polyester resin with a number average molecular weight of from 25,000 to 70,000, represented by Formula (2):

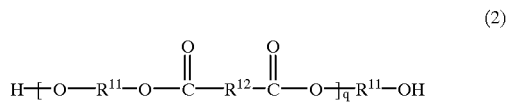

wherein q represents a degree of polymerization, and $R^{11}$ and $R^{12}$ each represent a divalent hydrocarbon group having 2 to 10 carbon atoms.

8. A biodegradable card of claim 4, wherein said biodegradable resin layer contains a polycaprolactone resin with a number average molecular weight of from 10,000 to 100,000, having a polymer unit represented by Formula (3):

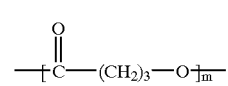

wherein m represents a degree of polymerization.

9. A biodegradable card, comprising a supporting substrate, a biodegradable resin layer formed on at least one side on the supporting substrate and an information recording layer formed on the supporting substrate or the biodegradable resin layer, wherein said supporting substrate comprises a biaxially oriented sheet of a biodegradable thermoplastic resin composition containing a lactic acid polymer; said information recording layer contains a biodegradable polymeric binder; said biodegradable card possesses sufficient durability, folding advance and rigidity to be useful in providing gate-access through the gate of a read-write head, and said biodegradable resin layer comprises at least one resin selected from the group consisting of (A) a polyester polyurethane resin with a number average molecular weight of from 10,000 to 100,000, represented by Formula (1):

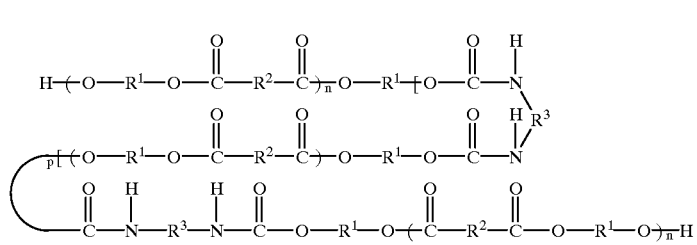

wherein n represents a degree of polymerization; p represents a number of 0 or 1 or more; $R^1$ and $R^2$ each independently represent a divalent hydrocarbon group having 2 to 10 carbon atoms; and $R^3$ represents a di- or poly-isocyanate residual group;

(B) a polyester resin with a number average molecular weight of from 25,000 to 70,000, represented by Formula (2):

$$H\text{-}[O\text{-}R^{11}\text{-}O\text{-}\overset{O}{\overset{\|}{C}}\text{-}R^{12}\text{-}\overset{O}{\overset{\|}{C}}\text{-}O]_q R^{11}\text{-}OH \quad (2)$$

wherein q represents a degree of polymerization, and $R^{11}$ and $R^{12}$ each represent a divalent hydrocarbon group having 2 to 10 carbon atoms;

(C) a polycaprolactone resin with a number average molecular weight of from 10,000 to 100,000, having a polymer unit represented by Formula (3):

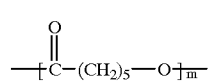

wherein m represents a degree of polymerization.

10. The biodegradable card of claim 9, wherein said lactic acid polymer has a number average molecular weight of from 10,000 to 1,000,000.

11. The biodegradable card of claim 9, wherein said biodegradable resin layer contains a polyester polyurethane resin with a number average molecular weight of from 10,000 to 100,000, represented by Formula (1):

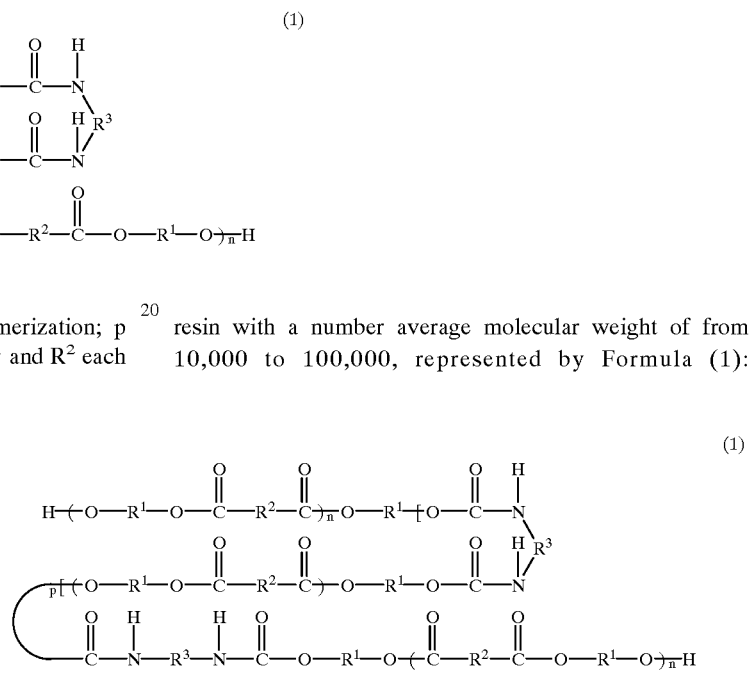

wherein n represents a degree of polymerization; p represents a number of 0 or 1 or more; $R^1$ and $R^2$ each independently represent a divalent hydrocarbon group having 2 to 10 carbon atoms; and $R^3$ represents a di- or poly-isocyanate residual group.

12. The biodegradable card of claim 9, wherein said biodegradable resin layer contains a polyester resin with a number average molecular weight of from 25,000 to 70,000, represented by Formula (2):

$$H\text{-}[O\text{-}R^{11}\text{-}O\text{-}\overset{O}{\overset{\|}{C}}\text{-}R^{12}\text{-}\overset{O}{\overset{\|}{C}}\text{-}O]_q R^{11}\text{-}OH \quad (2)$$

wherein q represents a degree of polymerization, and $R^{11}$ and $R^{12}$ each represent a divalent hydrocarbon group having 2 to 10 carbon atoms.

13. The biodegradable card of claim 9, wherein said biodegradable resin layer contains a polycaprolactone resin with a number average molecular weight of from 10,000 to 100,000, having a polymer unit represented by Formula (3):

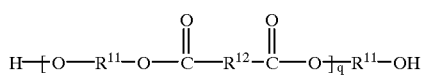

wherein m represents a degree of polymerization.

* * * * *